July 2, 1963 E. F. MANGIS 3,095,868
STONE FACING MACHINE CUTTER HEAD
Filed May 24, 1961 2 Sheets-Sheet 1

Elmer F. Mangis
INVENTOR.

BY
Attorneys

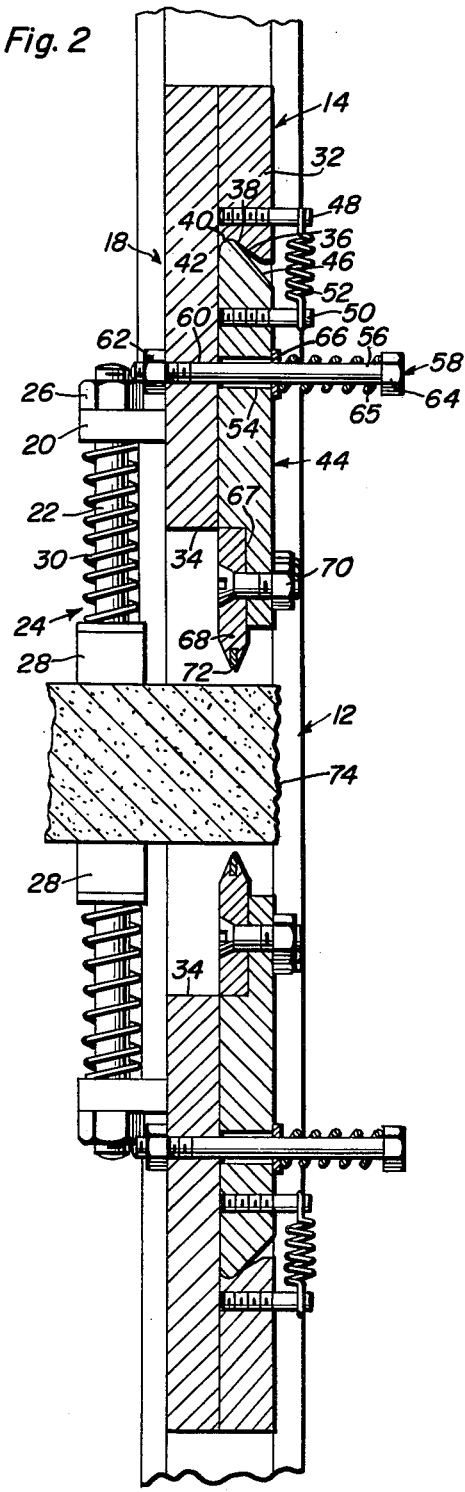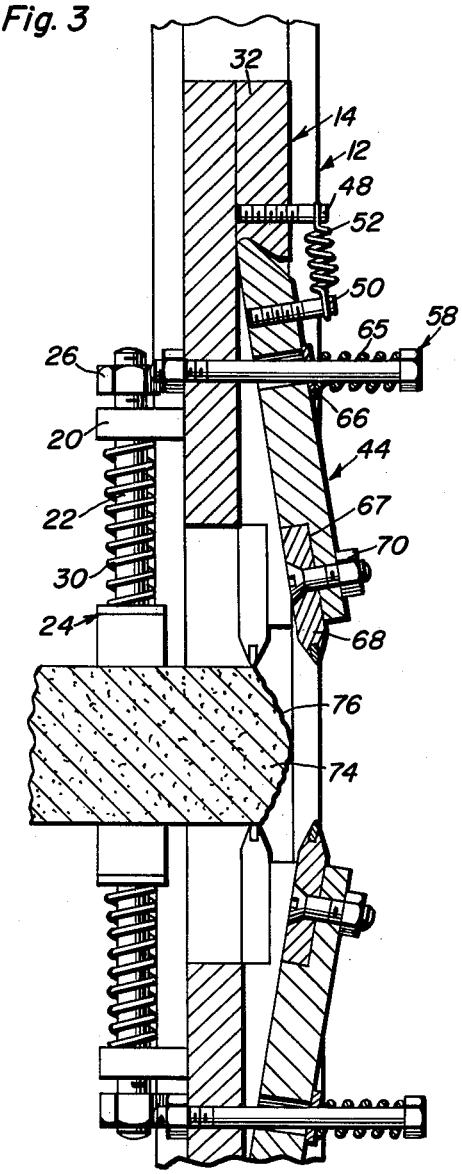

United States Patent Office 3,095,868
Patented July 2, 1963

3,095,868
STONE FACING MACHINE CUTTER HEAD
Elmer F. Mangis, Gossett Road, Frankfort, Ind.
Filed May 24, 1961, Ser. No. 112,357
13 Claims. (Cl. 125—23)

This invention relates to a novel and useful stone facing machine cutter head and more specifically to a stone facing machine cutter head which is adapted to be used in opposing pairs and to dress the side edge of a panel-like stone in a manner whereby that side edge will give the appearance of being "hand-dressed."

Panel-like stones are quite often used as a building material in very much the same manner in which bricks are used. However, the exposed side edge of a brick is most often planar and is designed to give a tailored appearance. However, when stone is used a rustic appearance is desired and substantially aligned and planar exposed side edges of stone panels used in the manner in which bricks are used for building material would not give a rustic appearance. Accordingly, the edge of the stone which is to be exposed is dressed to a generally straight but roughened edge.

Before the use of machinery became common for dressing building stone the edges of the stone which were to be exposed were hand faced with a chisel and a hammer. The type of face resulting from hand facing is considered to be the most desirable. However, increased cost in skilled labor has resulted in the price of hand faced stone being increased to a point which prohibits the use of hand faced stone in general building applications. Accordingly, it is the main object of this invention to provide a cutter head for stone facing machines which will be capable of facing building stone at a high rate of production and in a manner closely simulating "hand-dressed" stone. The stone facing machines used heretofore have been provided with rigidly mounted cutting knives for facing building stone and while these rigidly mounted cutting knives are fully capable of dressing building stone, being rigidly mounted they have a tendency to smoothly shear the edge of a building stone so that relatively smooth edges are formed which do not give the appearance of "hand-dressing." In addition, rigidly mounted cutter knives have a tendency to become more quickly dulled.

A further object of this invention, in accordance with the immediately preceding object, is to provide a stone facing machine cutter head which may be utilized in pairs to cut the edge of a building stone from remote sides of the stone in a manner whereby the cutting edges of the cutter knives are utilized only to effect the initial penetration of the opposite faces of the stone in order that the material to be removed from the stone may be in effect chipped therefrom.

A still further object of this invention is to provide a cutter head for a stone facing machine utilizing a plurality of cutter knives having elongated and longitudinally aligned cutting edges adapted to be moved transversely of the longitudinal extent of the cutting edges into engagement with one side face of a cutting stone with the cutting edges being staggered relative to each other in the direction of movement of the cutting edges toward the stone in order that each cutting edge may complete its cutting action on the stone before the next cutting edge engages the stone thereby progressively dressing the longitudinal extent of one side edge of the stone in order that considerably less effort at any given instant will be required to urge the cutting edges into engagement with the stone which is being dressed.

A final object of this invention to be specifically enumerated herein is to provide a stone facing machine cutter head which will conform to conventional forms of manufacture, be of simple construction and easy to service so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged fragmentary vertical sectional view taken substantially upon the plane indicated by the section line 2—2 of FIGURE 1 and showing the manner in which the holddown shoes of the cutter heads may be utilized to hold the stone which is to be dressed prior to and during the process of dressing one side edge of the stone;

FIGURE 3 is a fragmentary vertical sectional view similar to that of FIGURE 2 but showing the cutter heads in alternate positions with two of the cutting knives positioned as they would be immediately after completing cutting actions on the stone.

Figure 1:
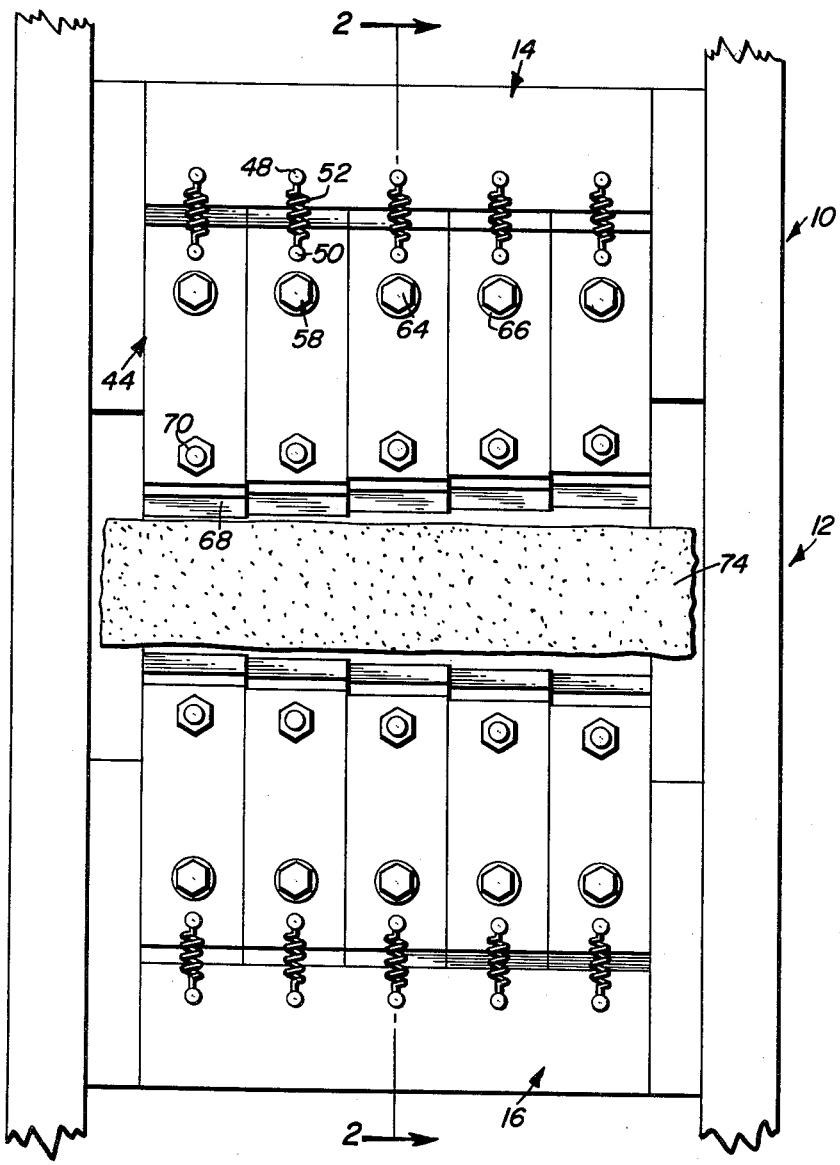
FIGURE 1 is a fragmentary side elevational view of a stone facing machine illustrating a pair of cutter heads of the instant invention disposed in operative positions on opposite side faces of a stone which is to be dressed in readiness for dressing one side edge of the stone.
Figure 4:
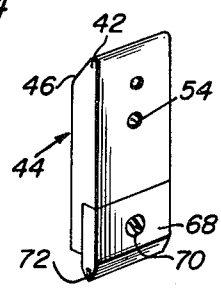
FIGURE 4 is a perspective view of one of the cutter knives.

Referring now more specifically to the drawings the numeral 10 generally designates a stone facing machine which includes a main frame generally referred to by the reference numeral 12 and a pair of cutter heads generally referred to by the reference numerals 14 and 16. Each of the cutter heads 14 and 16 is substantially identical and accordingly, only one of the cutter heads will be described in detail hereinafter.

The cutter heads 14 and 16 are mounted on the frame 12 for reciprocating movement toward and away from each other and each includes a mounting plate generally referred to by the reference numeral 18. Each of the mounting plates 18 includes at least one laterally directed apertured mounting ear 20 through which the shank portion 22 of a holddown shoe generally referred to by the reference numeral 24 is secured by means of a fastener 26. The holddown shoe 24 includes a head portion 28 and a compression spring 30 is disposed between the head portion 28 and the corresponding mounting lug or ear 20 to resiliently urge the head portions 28 toward each other. It is to be noted that the shank 22 is slidably received through the mounting lug 20.

Each of the mounting plates 18 includes an abutment plate 32 which is secured to one side face of the corresponding mounting plate in any convenient manner. The abutment plates 32 are spaced away from the adjacent edges 34 of the mounting plates 18 and the confronting edges of the abutment plates 32 are beveled as at 36 to form with the corresponding mounting plate a V-shaped pocket extending longitudinally of the corresponding mounting plate and opening toward the other cutter head. Each of the pockets 38 includes a transversely rounded apex 40 in which the rounded apex 42 of the corresponding cutter knife generally referred to by the reference numeral 44 is seated. The cutter knives 44 are elongated and extend toward each other. The remote ends of the cutter knives 44 are beveled as at 46 to form remote ends which are substantially V-shaped in longitudinal section. The rounded apices 42 of these V-shaped remote end portions of the cutter knives 44 form an occluded angle somewhat less than the occluded angle formed by the pockets 38 and accordingly it may be observed that the seated engagement of the V-shaped ends of the cutter knives 44 within the pockets 38 pivotally mount the remote ends of the cutter knives 44 on the cutter heads 14 and 16 for limited oscillating movement.

From FIGURE 2 of the drawings it may be observed that the confronting faces of the mounting plates 18 and the corresponding cutter knives 44 are disposed in surface-to-surface contacting relation whereby the mounting plates 18 constitute stop means or a limit abutment surface establishing a limit for the swinging movement of the adjacent ends of the cutter knives 44 in one direction.

It will be noted that each of the abutment plates 32 has a plurality of laterally projecting pins 48 secured thereto and that the cutter knives 44 of each cutter head 14 and 16 are provided with corresponding pins 50. A plurality of expansion springs 52 are secured between corresponding pins 48 and 50 to yieldably urge the rounded apices 42 of the cutter knives 44 into seated engagement with the corresponding pockets 38.

It will be noted that each of the cutter knives 44 is apertured as at 54 and that each of the apertures 54 loosely receives the shank portion 56 of a fastener generally referred to by the reference numeral 58 which is secured through a bore 60 formed in the corresponding mounting plate 18 by means of a fastener 62. Each of the fasteners 58 is provided with a head portion 64 which is disposed a spaced distance outwardly of the face of the corresponding cutter knife 44 remote from the mounting plate 18. A compression spring 65 is disposed about each shank 56 and between the head portion 64 thereof and the confronting face of the corresponding cutter knife 44. A friction washer 66 is disposed between each cutter knife 44 and the adjacent end of the corresponding compression spring 65. The compression springs 65 yieldably urge the cutter knives 44 into their limit position disposed in surface-to-surface abutting relation with the corresponding mounting plate 18.

It will be noted that the free ends of the cutter knives 44 are provided with L-shaped recesses 67 in which knife elements 68 are removably secured by means of fasteners 70. Each of the knife elements 68 includes a cutting edge 72 which extends transversely of the free end of the corresponding cutter knife 44. From FIGURES 1 and 2 of the drawings it may be observed that the cutting edges 72 all extend substantially in the same plane but that each cutting edge 72 of each mounting plate 18 is spaced a different distance from the horizontal medial plane of the stone 74. Additionally, it may be observed that each cutter knife 44 carried by one of the mounting plates has a cutter knife 44 carried by the other mounting plate disposed in opposing relation thereto. Further, the cutting edges 72 are disposed at progressively greater distances from the medial plane of the stone 74 in order that each pair of opposing cutter edges 72 may complete its cut before the next opposing pair of cutter edges engages the stone 74.

With attention now directed to FIGURE 3 of the drawings it will be noted that as each pair of directly opposite cutter knives 44 engages the stone 74, the cutting edges 72 thereof will slightly penetrate the opposite faces of the stone 74 a distance sufficient to cause the portion of the stone which is to be removed to chip away from the remainder of the stone. Inasmuch as the cutting edges 72 are necessarily beveled, the release of pressure along the side edge of the cutting edges 72 engaging the material which is to be removed as that material is removed enables the pressure along the opposite side edges of the cutting edges 72 to kick the adjacent ends of the cutter knives 44 laterally and outwardly away from the stone 74 as the next pair of cutter knives 44 are brought into engagement with the opposite side faces of the stone 74. The springs 65 will then urge the cutter knives 44 which have completed their cuts back into engagement with the dressed face 76 of the stone 74 until such time as the cutter heads 14 and 16 are moved away from each other. When the cutter heads 14 and 16 are moved away from each other the compression springs 65 will return all of the cutter knives 44 to the position illustrated in FIGURE 2 of the drawings in readiness for the next stone to be placed between the cutter heads 14 and 16.

Inasmuch as opposing pairs of cutter knives 44 engage the stone 74 in staggered relation, the thrust required to move the cutter heads 14 and 16 toward each other at any given time is appreciably reduced. In addition, as the cutter knives 44 are not rigidly mounted and are mounted in a manner whereby they may be kicked outwardly as hereinbefore set forth, the cutting edges 72 are not required to make the full cut which would be required if they were rigidly mounted thus enabling extended life of the cutting edges 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stone facing machine cutter head comprising a frame, a pair of cutter heads mounted on said frame for reciprocal movement toward and away from each other and adapted to receive a stone to be faced therebetween, a set of knives on each of said cutter heads defining pairs of opposing knives having opposing cutting edges, each of said edges substantially paralleling a plane extending between said heads and transversely of the direction of movement of said heads, the cutting edges of the knives of each set of knives being staggered relative to each other in distance from said plane so as to progressively face a stone disposed between said cutter heads, said cutter heads each including a holddown shoe adapted to engage a side face of a stone disposed between said heads and movably mounted for movement relative to the corresponding cutter head in the direction of the movement of the latter and yieldably urged toward a position extending beyond the corresponding cutting edges toward the other cutter head whereby a stone disposed between said cutter heads will first be engaged by said holddown shoes and then by said blades as said cutter heads move toward each other.

2. The combination of claim 1 wherein the pairs of opposing edges of said sets of knives are disposed corresponding distances from said plane.

3. The combination of claim 2 wherein the edges of each set of knives are longitudinally aligned and are spaced progressively from said plane in one direction along the plane in which said edges extend.

4. The combination of claim 1 wherein sets of knives are mounted for movement in substantially the same plane.

5. A stone facing machine cutter head comprising a frame, a pair of cutter heads mounted on said frame for reciprocal movement toward and away from each other and adapted to receive a stone to be faced therebetween, a set of knives on each of said cutter heads defining pairs of opposing knives having opposing cutting edges, each of said edges substantially paralleling a plane extending between said heads and transversely of the direction of movement of said heads, the cutting edges of the knives of each set of knives being staggered relative to each other in distance from said plane so as to progressively face a stone disposed between said cutter heads, at least the cutting edge portions of said knives being each mounted for movement laterally of the longitudinal extent of said cutting edges, said cutter heads including stop means engageable by said knives for limiting lateral movement of the latter in one direction, and means yieldably urging said blades in said one direction whereby as said cutting edges dress the side edge of a stone disposed between said sets of knives said knives will kick in the other direction upon completing a cut on said stone and will be then urged to said limit position by said urging means in preparation for the following cut whereby said cutting edges will dress said stone without smoothly shearing the latter.

6. A stone facing machine cutter head comprising a frame, a pair of cutter heads mounted on said frame for reciprocal movement toward and away from each other and adapted to receive a stone to be faced therebetween, a set of knives on each of said cutter heads defining pairs of opposing knives having opposing cutting edges, each of said edges substantially paralleling a plane extending between said heads and transversely of the direction of movement of said heads, the cutting edges of the knives of each set of knives being staggered relative to each other in distance from said plane so as to progressively face a stone disposed between said cutter heads, each of said cutter heads including a mounting plate extending in the general direction of movement of that head, said knives being elongated and extending along one side of the corresponding mounting plate and beyond the adjacent edges of said plates in the direction of its movement toward the other cutter head, said cutting edges being carried by adjacent ends of said sets of knives and extending transversely thereof, means pivotally mounting the remote ends of said knives to the corresponding mounting plates for movement of said adjacent ends thereof laterally of said cutting edges toward and away from the medial planes of said mounting plates with said plates defining abutment means limiting swinging movement in one direction.

7. The combination of claim 6 including means yieldably urging said knives in said one direction.

8. A stone facing machine cutter head comprising a frame, a pair of cutter heads mounted on said frame for reciprocal movement toward and away from each other and adapted to receive a stone to be faced therebetween, a set of knives on each of said cutter heads defining pairs of opposing knives having opposing cutting edges, each of said edges substantially paralleling a plane extending between said heads and transversely of the direction of movement of said heads, the cutting edges of the knives of each set of knives being staggered relative to each other in distance from said plane so as to progressively face a stone disposed between said cutter heads, each of said cutter heads including a mounting plate extending in the general direction of movement of that head, said knives being elongated and extending along one side of the corresponding mounting plate and beyond the adjacent edges of said plates in the direction of its movement toward the other cutter head, said cutting edges being carried by adjacent ends of said sets of knives and extending transversely thereof, means pivotally mounting the remote ends of said knives to the corresponding mounting plates for movement of said adjacent ends thereof laterally of said cutting edges toward and away from the medial planes of said mounting plates with said plates defining abutment means limiting swinging movement in one direction, the pairs of opposing edges of said sets of knives being disposed corresponding distances from said plane.

9. The combination of claim 8 wherein the edges of each set of knives are longitudinally aligned and are spaced progressively from said plane in one direction along the plane in which said edges extend.

10. The combination of claim 9 wherein said cutter heads each include a holddown shoe adapted to engage a side face of a stone disposed between said heads and movably mounted for movement relative to the corresponding cutter head in the direction of the movement of the latter and yieldably urged toward a position extending beyond the corresponding cutting edges toward the other cutter head whereby a stone disposed between said cutter heads will first be engaged by said holddown shoes and then by said blades as said cutter heads move toward each other.

11. A stone facing machine comprising a frame, a pair of cutter heads mounted on said frame for reciprocal movement toward and away from each other and adapted to receive a stone to be faced therebetween, at least one knife on each cutter head for cutting action movement therewith into engagement with opposite sides of said stone and cooperating as a pair of knives having opposing cutting edges, said cutter heads each also including a holddown shoe adapted to engage a side face of a stone disposed between said heads and movably mounted for movement relative to the corresponding cutter head in the direction of movement of the latter and yieldably urged toward a position extending beyond the corresponding cutting edges toward the other cutter head whereby a stone disposed between said cutter heads will first be engaged by said holddown shoes and then by said blades as said cutter heads are moved toward each other.

12. A stone facing machine comprising a frame, a pair of cutter heads mounted on said frame for reciprocal movement toward and away from each other and adapted to receive a stone to be faced therebetween, at least one knife on each cutter head for cutting action movement therewith into engagement with opposite sides of said stone and cooperating as a pair of knives having opposing cutting edges, at least the cutting edge portions of said knives being each mounted for movement laterally of the longitudinal extent of said cutting edges, said cutter heads including stop means engageable by said knives for limiting lateral movement of the latter in one direction, and means yieldably urging said blades in said one direction whereby as said cutting edges dress the side edge of a stone disposed between said sets of knives said knives will kick in the other direction upon completing a cut on said stone and will be then urged to said limit position by said urging means in preparation for the following cut whereby said cutting edges will dress said stone without smoothly shearing the latter.

13. A stone facing machine comprising a frame, a pair of cutter heads mounted on said frame for reciprocal movement toward and away from each other and adapted to receive a stone to be faced therebetween, at least one knife on each cutter head for cutting action movement therewith into engagement with opposite sides of said stone and cooperating as a pair of knives having opposing cutting edges, said heads also including opposing and yieldable holddown means spaced closer together than the corresponding cutting edges whereby a stone disposed between said cutter heads will first be engaged by said holddown shoes and then by said blades as said cutter heads move toward each other.

References Cited in the file of this patent

UNITED STATES PATENTS

| | | |
|---|---|---|
| 332,999 | Donelly | Dec. 22, 1885 |
| 541,823 | Bair et al. | July 2, 1895 |
| 2,867,204 | Arvay | Jan. 6, 1959 |

FOREIGN PATENTS

| | | |
|---|---|---|
| 172,816 | Germany | July 2, 1906 |